Jan. 10, 1956     S. C. ROCKAFELLOW     2,730,657
MULTIPLE PHASE CONTROL SYSTEM
Filed June 8, 1950
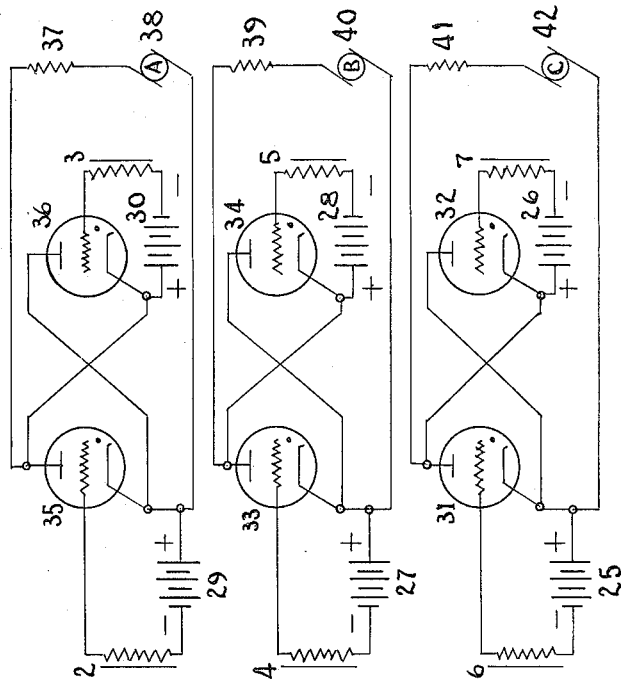
FIG. 1
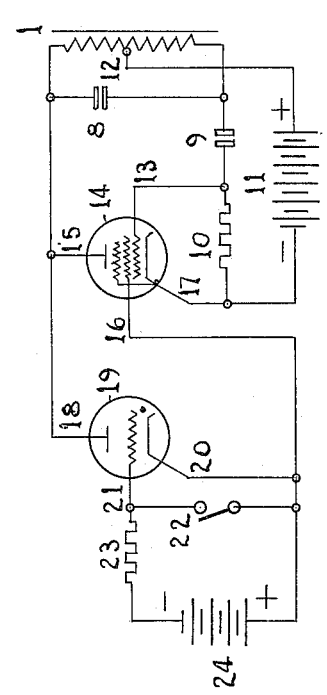
FIG. 2
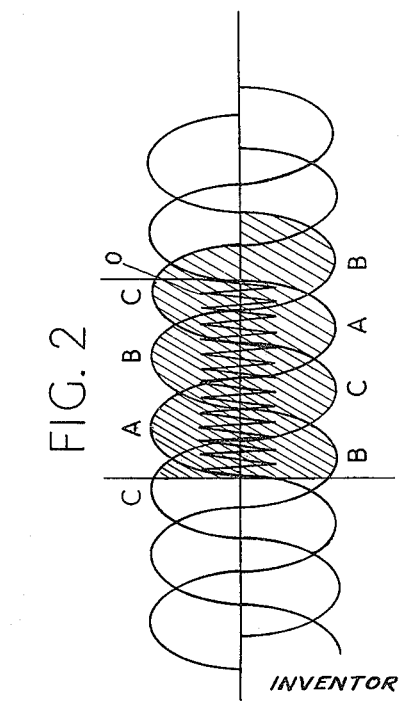
INVENTOR
STUART C. ROCKAFELLOW

United States Patent Office 2,730,657
Patented Jan. 10, 1956

2,730,657

MULTIPLE PHASE CONTROL SYSTEM

Stuart C. Rockafellow, Farmington, Mich., assignor to Robotron Corporation, Detroit, Mich., a corporation of Michigan Application June 8, 1950, Serial No. 166,788

5 Claims. (Cl. 315—146)

This invention relates to an electronic control system and has particular relation to an electronic control system with multiple phase sources wherein it is desired to initiate current flow from each of said sources simultaneously and to terminate such flow under conditions permitting each phase to complete whatever cycle is in progress at the time of actuation of the terminating means.

In some forms of control systems it is desirable to control the duration of current flow from each of two or more differently phased sources. In such a control system it is often desirable to start the passage of current from all phases at the same instant and to terminate the duration by having the respective phases finish out their cycles. This is particularly true in resistance welding circuits where it is desirable to supply three-phase current to the electrode load in order to minimize the load on any one phase.

In presently known systems accomplishing this general purpose, the control is not sufficiently accurate to meet the requirements of high speed resistance welding equipment and the resulting welding impulses are not of exactly predeterminable duration. This situation has, in the past, been a major obstacle to the use of three-phase current in welding circuits where it is desirable to supply three-phase current to the electrodes in order to minimize the load on any one phase. Particularly, mechanical devices for accomplishing the present purposes have been suggested but they are insufficiently flexible to meet the varying conditions required in practice and are insufficiently accurate to secure control for very short periods of time, such as one cycle.

This invention meets this problem by utilizing an oscillating circuit to effect simultaneous control over a group of thyratrons, which thyratrons are in the circuits of the respective phases to be controlled. More specifically the circuit utilizes a pair of thyratrons in back to back relationship controlling the current from each phase source. Each thyratron is normally rendered non-conductive by a constant negative bias in its grid circuit of sufficient magnitude to prevent conduction. By proper initiation of an oscillator circuit and the imposition of the resulting oscillating potentials onto the said grid circuits, this negative bias is cancelled with respect to each thyratron simultaneously and the thyratrons are permitted to conduct. Inasmuch as a thyratron when once ionized to start conduction will continue to conduct until the anode potential reaches zero, by starting the firing of the thyratrons by any one pulse of the oscillating circuit, the thyratrons will continue to pass current in the circuits of the respective phases so long as the anode supply of any one thyratron is above zero.

In the drawings:

Figure 1 is a circuit diagram of a specific embodiment of my invention.

Figure 2 is an illustration of the relationships of the several potentials involved.

Referring now to Figure 1, thyratrons 35 and 36 control the current through the load 37 as generated by alternating source 38. Thyratrons 33 and 34 control the current through the load 39 as generated from alternating source 40. Thyratrons 31 and 32 control the current through the load 41 from the alternating source 42.

Each thyratron has its grid biased negatively from a separate source, tube 35 from supply 29, tube 36 from supply 30, tube 33 from supply 27, tube 34 from supply 28, tube 31 from supply 25 and tube 32 from supply 26.

In series with each negative bias supply is a secondary winding, indicated at 2, 3, 4, 5, 6 and 7, of a transformer 1, the primary of which is a source of high frequency current pulses, such as 1000 cycles per second. These pulses are of sufficient amplitude to overcome the negative bias voltage, drive the grid positive, and initiate ionization in each thyratron. The circuit of each phase may be completely independent of the others.

Turning now to the oscillator which may be of any conventional type, as a Hartley circuit, and the oscillator control portion of the circuit, there is here provided a vacuum tube 14 having a cathode 17 and anode 15, a control grid 13 and a screen grid 16. The anode is connected to the primary winding 12 of the transformer 1, and the end of said winding is connected through a capacitor 9 to the control grid 13. A resistor 10 is connected between the control grid 13 and the cathode 17. A capacitor 8 is connected to the anode 15 at one side and at the other side is connected between the capacitor 9 and the primary winding 12. A source 11 of constant potential is connected at its positive end to a tap intermediate the ends of said primary winding 12 and at its other end to the cathode 17.

The control portion of the circuit comprises a small thyratron 19 whose anode 18 is connected to the anode 15 of the vacuum tube 14, and whose cathode 20 is connected to the screen grid 16 of the vacuum tube 14. A source 24 of constant potential is connected at its positive end to the cathode 20 of the thyratron 19 and at its negative end through a resistance 23 to the grid 21 of said last named thyratron. A switch 22 is connected between said grid 21 and said cathode 20.

*Operation*

At rest, the sources of constant potential 25, 26, 27, 28, 29 and 30 normally act to block said tubes and prevent conduction thereby. However, when pulses of alternating current are imposed by the oscillator onto the secondary windings 2, 3, 4, 5, 6 and 7 of the transformer 1, the constant potential of said sources are cancelled and the thyratrons commence conducting. With the tubes 31, 32, 33, 34, 35 and 36 conducting, the sources 38, 40 and 42 of alternating potentials, A, B and C will supply alternating current to the loads 37, 39 and 41, respectively. Once the thyratrons have started to conduct, they continue to do so until their respective anode voltages return to zero. Accordingly, the thyratrons will continue to conduct so long as the oscillating potentials appear on the said secondary windings, and when they cease, the thyratrons will continue to conduct until the next following zero point in the potential of each separate source of alternating potential A, B and C. Thus, with the commencement of oscillating potential imposed onto the transformer 1, current passes through each of the loads 37, 39 and 41 and begins at the same instant through each said load, and with the terminating of said oscillating potential, current passage through each of said loads will continue until the zero point in the potential of each source 38, 40 and 42 next following such termination.

In the light of the foregoing, it will be apparent that any number of sources of potentials A, B and C may be used, and they may be of any phase relation with respect to each other, although three phase potential from a single source is here assumed for illustrative purposes, and that said sources may be completely independent sources or they may be separate phases emanating from the same source.

Turning now to the oscillator, the source 11 of constant potential imposes a voltage across the principal electrodes of the vacuum tube 14. As current passes through said tube, it is fed back through the primary winding 12 to the grid 13 and functions in the well-known manner of conventional oscillators. This provides the oscillating potentials of high frequency on the secondary windings which function as above described.

Since a characteristic of this type of vacuum tube is that the screen grid must be under a positive potential in order for the tube to conduct, it is necessary that such be provided. If the screen grid is connected to the anode 15, such potential is provided every time that the vacuum tube conducts. This is accomplished through the thyratron 19. The source 24 of constant potential acts, when the switch 22 is open, to place a negative bias on the grid 21 with respect to the cathode 20, and thus to block conduction through said thyratron. When the switch 22 is closed, the said grid and cathode are placed at the same potential and the thyratron will conduct.

Therefore, when the switch 22 is open, the thyratron 19 is blocked and the vacuum tube 14 is blocked. Hence, no oscillating potentials are created in the primary winding 12 and no potentials appear in the secondary windings 2, 3, 4, 5, 6 and 7. Therefore, the biasing potentials from the sources 25, 26, 27, 28, 29 and 30 block their respectively connected power tubes and no current flows through the loads 37, 39 and 41. When the switch 22 is closed, the thyratron 19 conducts, and the screen grid 16 is connected to the anode 15 and received positive pulses therefrom. Thus, the oscillating circuit is permitted to operate and resultant pulses appear in the several secondary windings and the negative bias on the power tubes is cancelled. Thus the power tubes conduct in the manner and within the limits above described.

As illustrated by the shaded portion of Figure 2, all phases commence conduction through the respective loads simultaneously at whatever point in their respective cycles they may happen then to be in. So long as the switch 22 remains closed, oscillations in the transformer 1 will continue, represented by 0 in Figure 2, and current will continue through the several loads. When the switch 22 is opened, oscillations in said transformer cease. In the example illustrated in Figure 2, phase A has reached zero at the moment the oscillations ceased and hence no further current flows through the load 37. However, both of phases B and C are intermediate the zero points of their cycles, though one is positive and the other is negative, and, since the respective thyratrons here involved have already commenced conduction, these will continue until the respective potentials again reach the zero point at which time they will respectively stop.

It will be understood that the switch 22 may be any form of means for opening or closing a circuit and may include other electronic circuits and the term "switch" as used in the hereinafter appended claims shall be so interpreted. It will also be understood that the alternating sources 38, 40 and 42 may also be sources of pulsing direct current, providing only that the potential drops sufficiently between pulses to cause the thyratrons to stop conducting, in which case one from each pair of power tubes may be eliminated.

I claim:

1. In a control device for controlling the flow of electrical current through a plurality of separate load circuits, each thereof having a load and an independent source of alternating load potential, the combination: a pair of gas filled electric discharge devices and means connecting same in back-to-back relation in each load circuit, each of said electric discharge devices having principal electrodes and a control electrode; a source of constant biasing potential in the control electrode circuit of each of said electric discharge devices of such polarity that said electric discharge devices are normally non-conductive; a transformer having a plurality of secondary windings, one of which is in each of said control electrode circuits and connected in series with said source of bias potential; means including a constant power source and a vacuum electric discharge device imposing an oscillating potential onto the primary winding of said transformer, a screen grid in said vacuum electric discharge device and means including a switch connecting said screen grid to the anode of said vacuum electric discharge device.

2. In a control device for controlling the flow of an alternating electrical current through a plurality of separate load circuits, each thereof having a load and an independent source of alternating load potential, the combination: a pair of gas filled electric discharge devices and means connecting same in back-to-back relation in each load circuit, each of said electric discharge devices having principal electrodes and a control electrode; a source of constant biasing potential in the control electrode circuit of each of said electric discharge devices of such polarity that said electric discharge devices are normally non-conductive; a transformer having a plurality of secondary windings, one of which is in each of said control electrode circuits and connected in series with said source of bias potential; means including a constant power source and a vacuum electric discharge device imposing an oscillating potential onto the primary winding of said transformer, a screen grid in said vacuum electric discharge device, an initiating gas filled electric discharge device and means connecting the anode thereof to the anode of the vacuum electric discharge device and means connecting the cathode thereof to the screen grid of the vacuum electric discharge device; and means including a switch imposing at the will of an operator a potential onto the control electrode of said last-named electric discharge device such as to block current passage therethrough.

3. In a multi-phase alternating circuit wherein each phase is independently connected to a load, means for initiating current passage through said loads simultaneously and for terminating current passage through said loads under conditions permitting each phase to return to a zero point in its cycle, the combination: a pair of gas filled electric discharge devices and means connecting same in back-to-back relationship in the circuit of each of said phases, each of said devices having a control electrode and principal electrodes; a source of constant potential in the control electrode circuit of each of said gas filled electric discharge devices, said source supplying a potential of sufficient magnitude and of such polarity as to block current passage through said gas filled electric discharge devices; a transformer having a plurality of secondary windings, one of said secondary windings being in each of said control electrode circuits and connected in series with said source of bias potential; means including a source of constant potential and a vacuum electric discharge device connected with the primary winding of said transformer to supplying an oscillating potential thereto; a screen grid in said vacuum electric discharge device; a further gas filled electric discharge device, means connecting its anode to the anode of the vacuum electric discharge device and means connecting its cathode to the screen grid of the vacuum electric discharge device; a further source of constant potential and means connecting the negative end thereof to the control electrode of said last named electric discharge device and means connecting the positive end to the cathode of said last-named electric discharge device; said last-named means including a switch connecting said last-named control electrode to said last-named cathode.

4. In a control device for controlling the flow of electrical current through a plurality of separate load circuits, each thereof having a load and an independent source of alternating load potential, a pair of gas filled electric discharge devices and means connecting same in back-to-back relation in each load circuit, each of said electric discharge devices having principal electrodes and a control electrode; a source of constant biasing potential in the control electrode circuit of each of said electric discharge devices of such polarity that said electric discharge devices are normally non-conductive; means selectively and controllably applying a potential in the control electrode circuits of each of said electric discharge devices, which potential alternates at a frequency substantially in excess of the frequencies of said sources of alternating load potential and is of sufficient magnitude to cancel said biasing potential when it is of opposite polarity with respect thereto.

5. In a control device for controlling the flow of electrical current through a plurality of separate load circuits, each thereof having a load and an independent source of alternating load potential, the combination: a pair of thyratrons and means connecting same in back-to-back relation in each load circuit, each of said thyratrons having principal electrodes and a control electrode; a source of constant biasing potential in the control electrode circuit of each of said thyratrons of such polarity that said thyratrons are normally non-conductive; a transformer having a plurality of secondary windings, one of which is in each of said control electrode circuits; means including a constant power source and a vacuum electric discharge device imposing an oscillating potential onto the primary winding of said transformer, a screen grid in said vacuum electric discharge device and means including a switch connecting said screen grid to the anode of said vacuum electric discharge device.

References Cited in the file of this patent

UNITED STATES PATENTS

| | | |
|---|---|---|
| 2,120,564 | Lord | June 14, 1938 |
| 2,231,582 | Knight et al. | Feb. 11, 1941 |
| 2,263,307 | Lord | Nov. 18, 1941 |
| 2,372,017 | Rogers | Mar. 20, 1945 |
| 2,508,145 | Daniels | May 16, 1950 |